United States Patent
Halfmann et al.

(10) Patent No.: US 8,175,062 B2
(45) Date of Patent: May 8, 2012

(54) METHOD AND STATION FOR TRANSMITTING DATA IN A RADIO COMMUNICATION SYSTEM

(75) Inventors: Rüdiger Halfmann, Otterberg (DE); Hui Li, München (DE); Matthias Lott, Neuried (DE); Egon Schulz, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 497 days.

(21) Appl. No.: 12/241,994

(22) Filed: Sep. 30, 2008

(65) Prior Publication Data

US 2009/0029653 A1   Jan. 29, 2009

Related U.S. Application Data

(63) Continuation of application No. 10/525,832, filed on Feb. 25, 2005, now abandoned.

(30) Foreign Application Priority Data

Aug. 27, 2002   (EP) ..................................... 02019237

(51) Int. Cl.
*H04W 4/00* (2009.01)
(52) U.S. Cl. ........ 370/332; 370/447; 370/461; 370/462; 455/441
(58) Field of Classification Search .................. 370/328, 370/329, 332, 445, 447, 461, 462; 455/441
See application file for complete search history.

(56) References Cited

U.S. PATENT DOCUMENTS

| | | | |
|---|---|---|---|
| 5,093,927 A * | 3/1992 | Shanley | 455/513 |
| 5,428,818 A | 6/1995 | Meidan et al. | |
| 5,448,751 A | 9/1995 | Takenaka et al. | |
| 5,649,303 A | 7/1997 | Hess et al. | |
| 6,249,682 B1 * | 6/2001 | Kubo et al. | 455/522 |
| 6,463,261 B1 | 10/2002 | Hiramatsu et al. | |
| 7,218,893 B2 * | 5/2007 | Larsson et al. | 455/63.1 |
| 2002/0044614 A1 | 4/2002 | Molnar et al. | |
| 2002/0089947 A1 | 7/2002 | Holtzman et al. | |
| 2004/0198235 A1 | 10/2004 | Sano | |
| 2005/0063356 A1 * | 3/2005 | Larsen et al. | 370/351 |

FOREIGN PATENT DOCUMENTS

| | | |
|---|---|---|
| JP | 11-127107 | 5/1999 |
| WO | 02/19743 | 3/2002 |

OTHER PUBLICATIONS

U.S. Appl. No. 10/525,832, filed Feb. 25, 2005, Ruediger Halfmann et al., Nokia Siemens Networks GMBH & Co. KG.
U.S. Office Action issued on Oct. 24, 2007 in parent U.S. Appl. No. 10/525,832.
U.S. Office Action issued on Jul. 1, 2008 in parent U.S. Appl. No. 10/525,832.
U.S. Notice of Abandonment issued on Jan. 21, 2009 in parent U.S. Appl. No. 10/525,832.

\* cited by examiner

*Primary Examiner* — Christopher Grey
(74) *Attorney, Agent, or Firm* — Staas & Halsey LLP

(57) ABSTRACT

In a communication system, a first transmitting station transmits a transmission signal to a first receiving station for transmitting a sequence of data via a radio interface. The radio interface is monitored with respect to an interference signal from an interference source prior to transmission via at least one of the first transmitting station and the first receiving station. The transmission only begins if the radio interface is sufficiently free from interference for a moment in time.

10 Claims, 4 Drawing Sheets

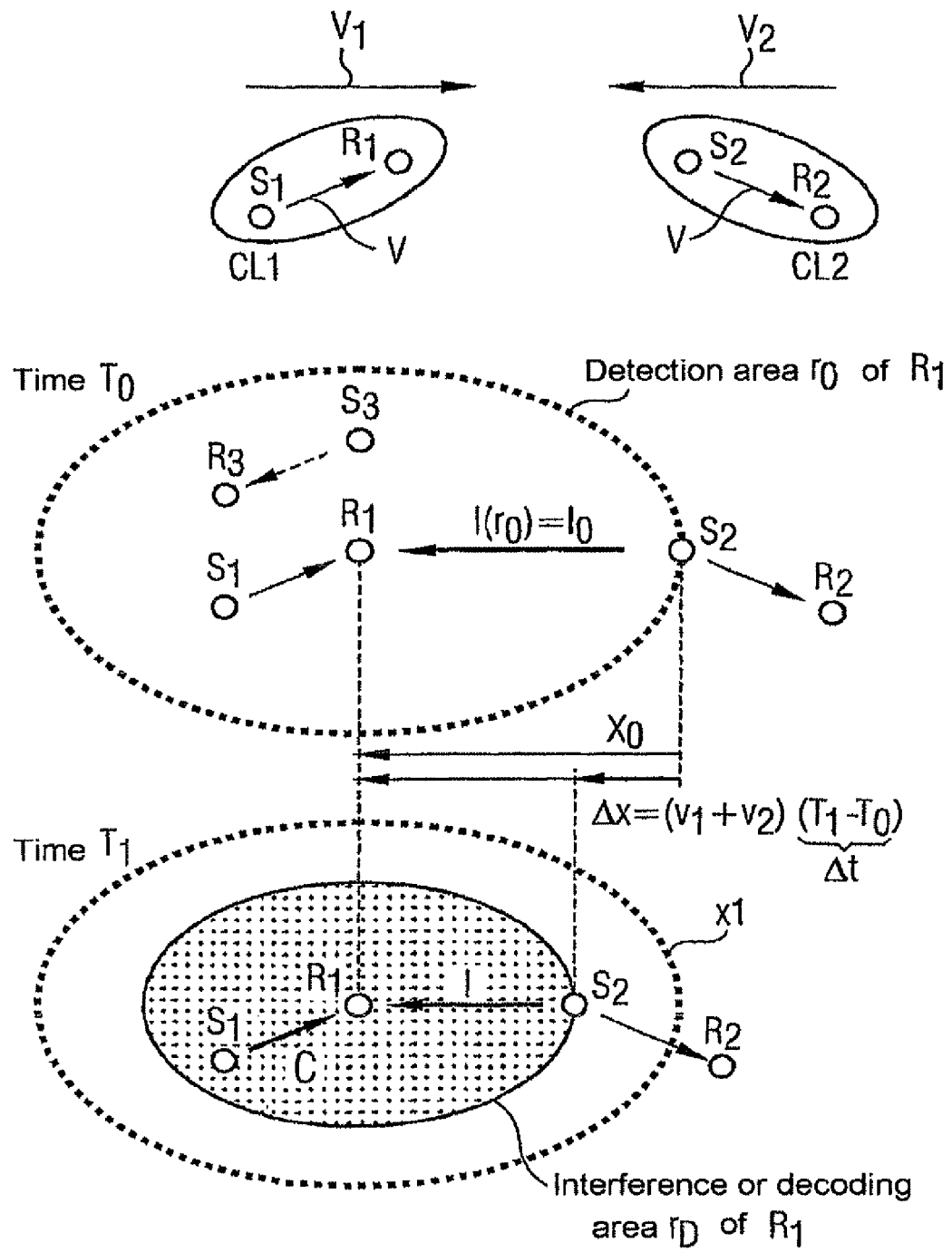

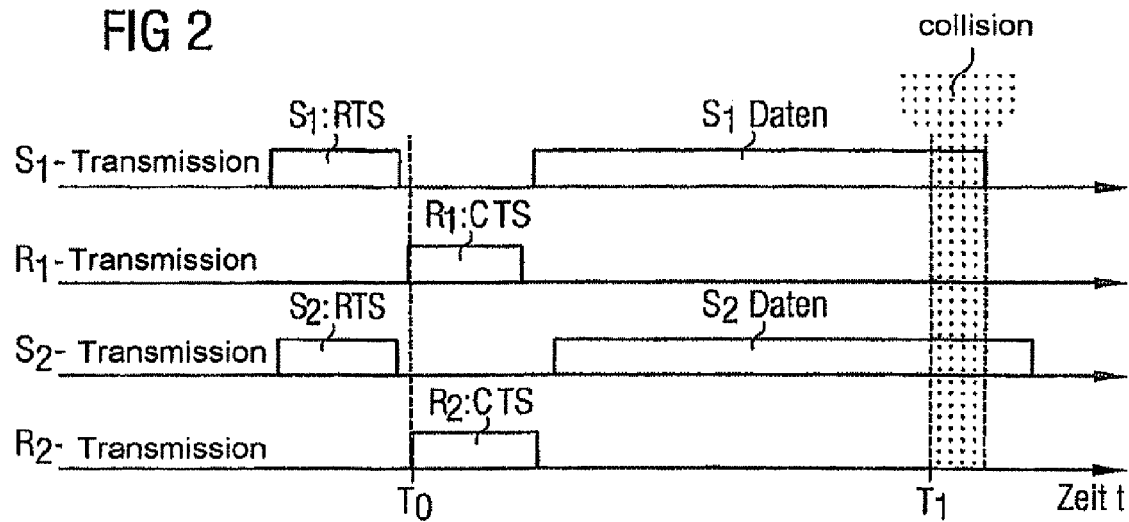
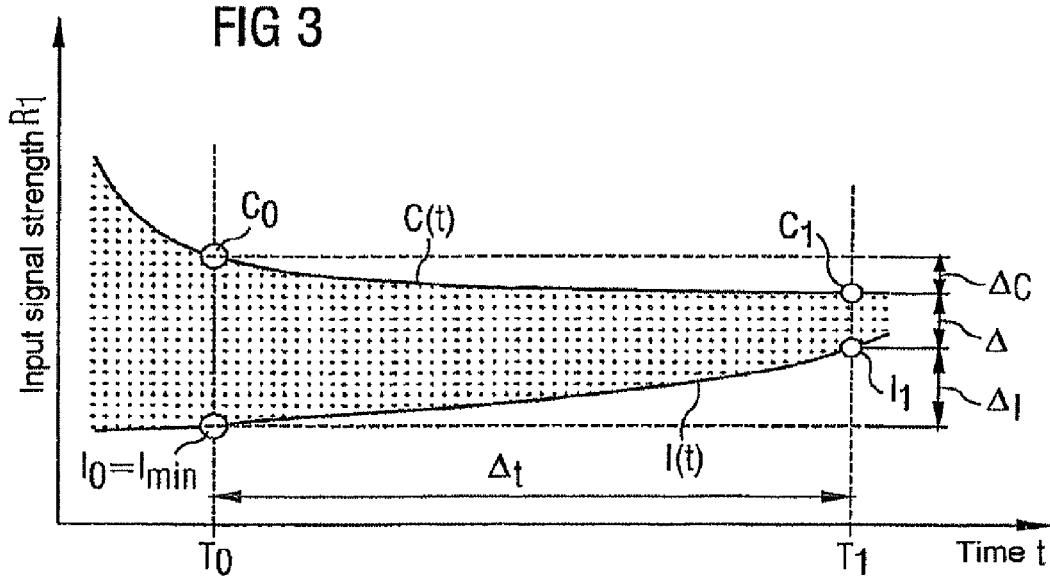

METHOD AND STATION FOR TRANSMITTING DATA IN A RADIO COMMUNICATION SYSTEM

CROSS REFERENCE TO RELATED APPLICATIONS

This application is a Continuation of application Ser. No. 10/525,832, filed Feb. 25, 2005 now abandoned, and hereby claims priority to European Application No. 02019237.3 filed on Aug. 27, 2002, the contents of which are hereby incorporated by reference.

BACKGROUND OF THE INVENTION

1. Field of the Invention

The invention relates to a method for transmitting data in a radio communication system or a mobile transmitter and/or receiver station for such purpose.

2. Description of the Related Art

In mobile communication systems, such as, for example, GSM (Global System for Mobile Communications) or UMTS (Universal Mobile Telecommunications System), the transmitting power of the communication partner is optimized with respect to the quality of the connection. To this end, control mechanisms are used, which set the transmitting power so as to attain a desired bit error rate and/or a certain level of reception.

In ad hoc networks, also referred to as self-organizing networks, several network stations are able to create a radio connection between each other without a central transmitting device. The connection between two stations is made either direct or where the distance between them is greater, the connection is made via further stations of the same kind, which form relay stations for this connection. These self-organizing networks are, for example, local radio networks (WLANs: Wireless Local Area Networks) in accordance with the HiperLAN and IEEE 802.11 standards. Such networks are not only used in the usual Internet and telematics areas but also in the area of inter-vehicle communication, such as, for example, systems warning of dangers or cooperative driver assistance systems.

A particular advantage of ad hoc networks lies in their great mobility and flexibility. Radio connections can be created between stations wherever required and they are not dependent on permanently installed base stations or on a predetermined radio network plan. Thereby, connections from one station to a target station can be realized directly or by relay stations via a large number of possible paths. The great mobility of the individual stations that make up the ad hoc network, however, also implies that the environment conditions can change very quickly for a subscriber in an ad hoc network. If the power used when transmitting is too great, or if an outside station transmitting on the same resource moves into the receiving area of a receiving station, this results in increased interference on various connections and in a reduction in the quality of reception in the individual connections.

In HiperLAN 1 and 2 there are performance classes, which give the transmitting power intensity for a station for different situations. There are no performance classes in IEEE 802.11. Normally the mobile stations transmit using the maximum power provided for in the standard. Power regulation is not provided for.

What is problematic, especially with ad hoc networks, is a situation where two clusters each having one transmitting and one receiving station are moving towards each other. If the respective selection of the resources on the radio interface of the two clusters is made at a moment in time when there is as yet no knowledge of the other cluster, then there is a possibility that the transmitting stations of both clusters select exactly the same resource for their transmissions. In particular with clusters that are moving towards each other quickly, there is a danger that the receiving station of a clusters, as well as receive signals from its own assigned transmitting station, also receives signals from the other transmitting station of the other cluster. In this case, interference would occur, which in a bad case could prevent a reconstruction of the desired receive signal.

According to the IEEE 802.11 Standard, the influence of the mobility on the transmission efficiency can be compensated for by controlling the transmitting power and by adapting the error correction capacity. Disadvantageously, the maximum permitted transmitting power and the possibilities for adapting the error correction capacity are limited and, therefore, not sufficiently suited to compensate when the mobility is high.

Moreover, the use of power control mechanisms can even increase system instability within mobile ad hoc networks. As soon as the distance between the two clusters becomes less, the two transmitting stations would increase their own transmitting power to compensate for detected interference from the transmitting station of the other cluster. Consequently, the receiving stations measure increasing interference and prompt their own transmitting station to increase its transmitting power further. Disadvantageously the power control mechanisms currently used are not sufficiently powerful for such compensation.

SUMMARY OF THE INVENTION

An object of the invention is thus to specify an advantageous method or transmitter and/or receiver stations in radio communication networks, in particular in ad hoc networks, which reduce collisions on the radio medium caused by moving stations or moving interference sources.

Particularly advantageous in this respect is a method for transmitting a sequence of data in a communication system, in which a first transmitting station transmits a transmission signal to transmit the sequence of data to a first receiving station via a radio interface, the radio interface is checked for any interference signal from an interference source before the transmission by at least the first transmitting station and/or the first receiving station and the transmission is not begun unless the radio interface is sufficiently free from interference at a moment in time, whereby the interference source moves in relation to the first receiving station and moves nearer thereto, and in addition, the transmission only begins if, in the time required to transmit the sequence of data, the interference source can move nearer only to such an extent that the interference signal does not interfere with the transmission.

In particular, to implement such a method, a communication system with mobile transmitter and/or receiver stations and/or mobile interference sources, in particular a second transmitting station as a mobile interference source, is of advantage if the communication system has a velocity determining device for determining velocities and/or relative velocities of the stations and/or interference source to each other, a carrier status determining device, in particular carrier scanning device for determining or locating a carrier free from interference for an intended transmission of a sequence of data and a threshold determining device for determining a threshold value for a minimum difference between a desired receive signal and an interference signal and/or a device for setting transmission duration to preset a maximum possible transmission duration for transmitting a sequence of data.

Of advantage is, in particular, to determine or to estimate an expected change, especially an increase in the intensity of the interference signal at the first receiving station using the actual and/or maximum possible relative velocity of the interference source and the first receiving station to each other. Based on such a determination or estimation of relative velocities, it is possible to determine a length of time for a known interference source or the assumption of an interference source with known intensity of interference and maximum possible relative velocity, within which length of time no interference source with too strong an interference signal can penetrate into the decoding area of the first receiving station.

It is particularly advantageous to determine or to estimate an expected change, especially a decrease in the intensity of the transmission signal at the first receiving station dependent on an actual and/or maximum possible relative velocity of the first transmitting station and of the first receiving station to each other. Such a relative velocity between the first transmitting station and the first receiving station makes it possible to estimate whether a change is to be expected in the receiving intensity of the desired receive signal in the first receiving station, which, in the end, allows a higher or lower intensity in an interference signals that is to be expected or possibly to be expected.

It is of advantage for the stations and interference sources within a detection area in the first receiving station to use their respective determinable or transmitted velocities, whereby, a normal interference source within the detection areas can be identified as an interference source especially by the first receiving station. Thereby, velocities that can be determined are velocities of the stations themselves or of other stations and interference sources, which can be determined from the characteristics of the station, in particular of the first receiving station itself. Transmitted velocities are velocity information that is transmitted to the first transmitting station and/or the first receiving station by another station or possibly stationary devices as well as possibly by the interference source itself. This is particularly advantageous where the first receiving station or the first transmitting station is either not itself able to determine velocities of this kind or, because of the conditions of reception, they are not yet able to detect and determine a more distant interference source by themselves.

It is advantageous to use standard maximum possible or maximum reasonable velocity for the stations and interference sources within a detection area of the first receiving station without the related velocity information and/or for the stations and interference sources outside a detection area of the first receiving station without the related velocity information. In this way, in the event that there is no information on the interference sources or other stations, a standard value, or, where receiving conditions are to be kept specially high, a worst possible value, can be used for the velocities of the stations and/or possible interference sources, so that even where there are no corresponding options for determining or receiving options for identifying velocities and/or interference signals, there is the possibility of applying the method.

The maximum available length of time for transmitting the sequence of data without interference can advantageously be determined using the expected change in the intensity of the interference signals and/or the expected change in the intensity of the transmission signals.

A threshold value for a minimum required difference in the intensity of the transmission signal to the intensity of the interference signal can advantageously be determined and/or estimated as the measurement for a signal that does not interfere with the transmission signal.

A decoding area can be advantageously set or determined around the first receiving station, whereby the interference signal of the interference source within the decoding area would cause unacceptable interference.

Advantageously, station related and/or station determined parameters and/or parameters related to transmission conditions and/or parameters, in particular a threshold value and/or a maximum possible transmission duration, can be exchanged between the first receiving station and the first transmitting station. Station related parameters are, for example, own velocity or transmitting power of a station or, at a receiving station the receiving intensity of the desired receive signal or the intensity of a receiving interference signal. These parameters can either be determined or identified using the station itself, but it is also possible that these stations are identified by other stations or devices in the environment and transmitted, for example, via a radio interface. As interface dependent parameters are to be understood in particular parameters that vary from each other because of various differences in velocity between the individual stations and/or interference sources. In particular this parameter depends on numerous other relevant parameters, which are radio system specifically and environment specifically influenced.

Advantageously, this method can be used in ad hoc communication systems, especially in accordance with the IEEE 802.11 standard. This applies both for the adaptive carrier scanning and for the burst operating mode adaptation or the combination of both methods. By burst operating mode adaptation is understood the adaptation of the transmission conditions for a sequence of data, i.e. in particular the type and structure of a data transmission frame, the number of bits to be transmitted in a sequence or the duration of a transmission block. In general, over and above that, the method can be applied to communication systems that use medium access control schemata based on carrier scanning and in which the mobility of the transmitting and/or receiving stations must be allowed for. One of such is the BMBF (Federal Ministry of Education and Research) "FleetNet" project for a communication from vehicle to vehicle, whereby these schemata are based on modified architectures of the protocols for UTRA TDD HCR/LCR and TSM (UTRAN: UMTS Terrestrial Radio Access Network TDD: Time Division Duplex, HCR/LCR: High/Low Chip Rate TSM: TD-SCDMA System for Mobile; TD-SCDMA: Time Division—Synchronous Code Division Multiple Access).

BRIEF DESCRIPTION OF THE DRAWINGS

These and other objects and advantages of the present invention will become more apparent and more readily appreciated from the following description of an exemplary embodiment, taken in conjunction with the accompanying drawings, of which:

FIG. 1 is a schematic diagram of two clusters moving towards each other each with at least one transmitting and at least one receiving station in an ad hoc network, FIG. 2 is a timing diagram of a schema to elucidate the transmissions and potential collisions in such a situation taking the advance of time into consideration, FIG. 3 is a graph of the signal strengths of the signals received in a receiving station, which signals were transmitted by the two transmitting stations.

DETAILED DESCRIPTION OF THE PREFERRED EMBODIMENT

Figure 4:
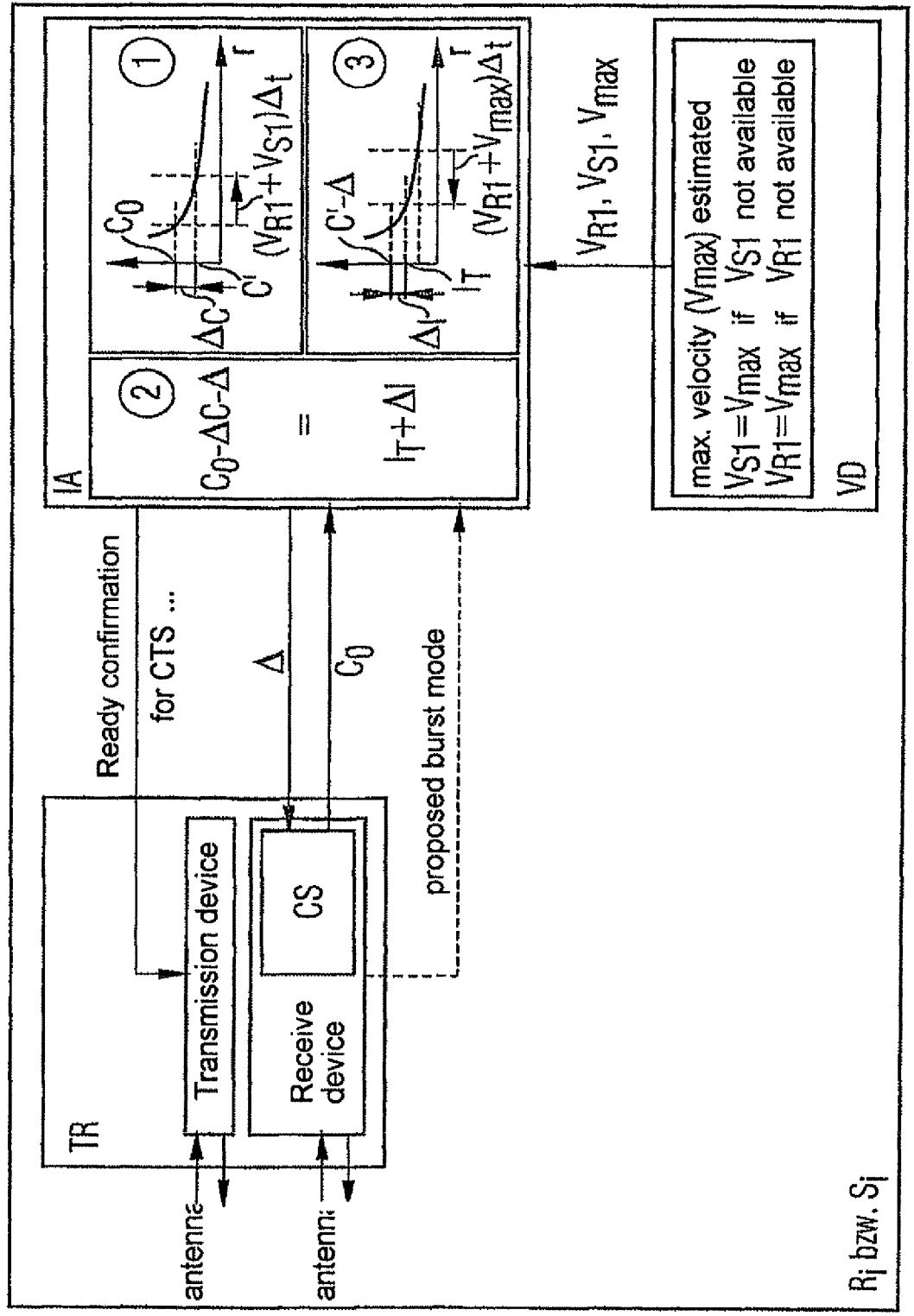
FIG. 4 is a block diagram of a schema to clarify a procedure for avoiding collisions taking carrier scanning into consideration and FIG. 5 is a block diagram of a schema to illustrate a method for avoiding collisions taking burst operating mode adaptation into consideration.

Reference will now be made in detail to the preferred embodiments of the present invention, examples of which are illustrated in the accompanying drawings, wherein like reference numerals refer to like elements throughout.

As can be seen from FIG. 1, clusters CL1, CL2—each made up of stations S1, R1, S3, R3 or S2, R2 communicating with each other via radio interfaces V—develop into so-called ad hoc radio networks as an example of a radio communication system. To simplify the following description, one station at a time S1 or S2 of the first or second cluster CL1, CL2 is regarded as the transmitting station S1 or S2 and a further station R1, R2 of the first or second cluster CL1, CL2 is regarded as the receiving station R1, R2. Of course, it is also possible and standard to transmit in the opposite direction. In the transmission illustrated, it is assumed that data with signaling and/or information content is transmitted by the respective transmitting station S1, S2 to the corresponding receiving station R1 or R2. Before such data is transmitted, signaling data (RTS, CTS) is normally exchanged between the corresponding transmitting and receiving stations S1, R1 or S2, R2, to adapt the transmitting parameters and the assignment of the available resource to each other.

As can be seen from FIG. 2, in particular the transmitting station S1, which wants to transmit data to the receiving station R1, is sending out RTS (Ready To Send) signaling to indicate readiness to transmit data to the receiving station R1. The receiving station R1, which can be the target station or a relay station on the data transmission path to a more remote target station if desired, sends CTS (Clear To Send) response signaling when it is ready to receive data and after the required parameters have been adapted, which response signaling CTS (Clear To Send) indicates readiness to receive the data or the sequence of data. Subsequently the actual data is transmitted by the transmitting station S1 to the receiving station R1. As can be seen from FIG. 2, a similar process takes place when data is transmitted by the transmitting station S2 of the second cluster CL2 to the receiving station R2 of the second cluster CL2.

As can be seen from FIG. 1, for the following observations, it is assumed that the two clusters CL1 and CL2 are moving towards each other with a direction component with a relative velocity, $$\Delta v = v_1 + v_2 \qquad (1)$$

whereby the relative velocity $\Delta v$ is made up of the two individual velocities v1, v2 of the two clusters CL1 or CL2. While, in the following, we will look at the situation of two clusters CL1, CL2 moving towards each other, these considerations apply, of course, to any situation in which a transmitting station S2 moves into the receiving area of an outside receiving station R1.

For a first moment in time $T_0$, it is assumed that a first group from the first transmitting station S1 and from the first receiving station R1 establish a communication via the radio interface V As is illustrated, further stations R3, S3 are not critical here, if, despite transmission activity in the receiving area $r_R$ of the first receiving station R1, they are transmitting on a different resource, e.g. on a different frequency. As can be seen from the first two lines of FIG. 2, communication for the transmission of data is initiated by a preliminary exchange of signaling data or signaling RTS, CTS.

At this first moment in time C0, the second transmitting station S2 of the second cluster CL2 should still be outside the receive or detection area $r_R$ of the first receiving station R1 or at the border of such area. The second transmitting station S2 establishes a communication link to the second receiving station R2, as can be seen from the two lower lines of FIG. 2. For this communication too, there is a preliminary exchange of signaling RTS, CTS, before the actual transmission of the useful data is initiated. As the second transmitting station S2 has no knowledge of the communication between the first transmitting station S1 and the first receiving station R1, then in the following it is assumed that, to communicate with the second receiving station R2, the second transmitting station S2 accesses the same resource as is used by the two other stations S1, R1.

As a result of the second transmitting station S2 moving in the direction of the first receiving station R1, at the moment in time T0 or directly after, the second transmitting station S2 reaches the detection area $r_R$ of the first receiving station R1. At this moment in time T0, the space $x_0$ between the second transmitting station S2 and the first receiving station R1 corresponds to the maximum receiving area $r_R$ of the first receiving station R1. At this moment in time T0, the first receiving station, as can be seen from FIG. 3, receives a strong receive signal C0 from the first transmitting station S1 and, from the second transmitting station S2, a second receive signal I0 as an increasingly interfering signal I (t). Apart from possible fluctuations in the transmitting power or amplifying and/or attenuating environmental conditions, the first receive signal C (t) and the second receive signal I (t) depend especially on the distance to the first transmitting station S1 or the second transmitting station S2.

In the following, the starting point is the problematic situation that during the initiation of the two transmission procedures between the first transmitting station S1 and the first receiving station R1 on the one hand, and, on the other hand, the second transmitting station S2 and the second receiving station R2, no knowledge of each other existed and, hence, the same resources were chosen. Further, it is assumed that a specific length of time is required for each transmission of data, whereby the second transmitting station S2 approaches the first receiving station R1 at such a speed that there is a collision on the two connections in first receiving station before the transmission of the data is completed. At the corresponding later moment in time T1, the first receiving station R1 receives both data from the first transmitting station S1, which data is meant for the receiving station, and also data from the second transmitting station S2, which data is actually meant for the second receiving station R2. Thereby the intensity C1 of the receive signal of the data from the first transmitting station S1 is only one intensity amount greater in the first receiving station R1 than the interference receiving intensity I1 of the data from the second transmitting station S2. In the moment in which the differential intensity falls below $$\Delta = \Delta C - \Delta I \qquad (2)$$

such a defined threshold value $\Delta$, the interference becomes so great that in the first receiving station R1 it is no longer at all possible or not possible with sufficient security to dismantle and reconstruct data being received from the first transmitting station S1. At this later moment in time T1, looking at the distance x1, the second transmitting station S2 has penetrated into the decoding area $r_D$ of the first receiving station $R_1$. In this moment a maximum required bit error rate BER can no longer be guaranteed for the connection between the first transmitting station S1 and the first receiving station R1.

For the following observations, we thus look at a detection area $r_R$ and a decoding area $r_D$. Thereby the detection area $r_R$ is the area around a receiving station R1, in which the latter receives a signal strength of the interference signal I (t) below a predetermined interference signal threshold $I_{min}$, which does not allow fragmentation, and hence, as seen from the first receiving station R1, the radio channel is determined to be unused or "idle". The signal intensity $I_{min}$ denotes the maximum area $r_R$ for detecting a potentially interfering station S2.

On the other hand, the decoding area is determined by a minimum distance between a receiving station R1 and a station S2 that is interfering with the receiving station, whereby, with a distance greater than this decoding distance $r_D$, a relation of a receive signal strength $C_0$ on the carrier of an assigned transmitting station S1 to an interfering interference signal $I_0$ of an interfering second station S2 still has at least a threshold value $\Delta$, by which value it is possible to detect the receive signal. Thereby, the threshold value $\Delta$, apart from being dependent on the distance $r_0$ or r (t) of the interfering transmitting station S2, is also dependent on numerous other parameters, especially on the distance of the assigned transmitting station S1, on the modulation method used, on the coding scheme used and on the bit error rate required.

The distance of the first transmitting station S1 to the first receiving station R1, which also has an effect on the actual threshold value $\Delta$, must also be taken into consideration. As can be seen from FIG. 3, in the chosen embodiment, the distance between these two stations S1 and R1 becomes greater with time t over the observed interval of time $\Delta t$ between the first and the second moment in time T0 or T1, e.g. because the first transmitting station S1 is not moving as fast as the first receiving station R1 in the direction of the second transmitting station S2. Hence the critical threshold value $\Delta$ is reached correspondingly earlier.

In these observations, it was assumed that at points in time t2, t1<T0 the two transmitting stations S1 and S2 measured the signal intensity on the desired carrier frequency f0 and the radio channel was detected as being free, as, at the points in time t1 or t2, the distance between the two stations involved from the two clusters CL1, CL2 was greater than the detection area of these stations. Hence, at the points in time t1 or t2, the two transmitting stations S1 and S2 send RTS signaling to create a radio connection to the assigned receiving stations R1 or R2. At the same time, the resource is reserved on the radio interface V so that other stations S3, R3 in the detection area cannot access this resource for a preset subsequent time. Thus a requisite time is reserved for the subsequent data transmission.

The decoding of the RTS signaling informs a desired destination or relay station as receiving station R1, R3, S3 or R2, that a connection should be established between the two desired stations S1 and R1 or S2 and R2.

After the RTS signaling has been received, at the moment in time T0, the desired destination or relay station responds as receiving station R1 to the first transmitting station S1, or, in the other cluster CL2, the second receiving station R2 responds to the second transmitting station S2, with a corresponding CTS response signaling to signal readiness to receive. Prior to the response signaling, usually the receiving stations R1 or R2 have also checked the resource and determined that this resource is available. As the stations of the different clusters CL1, CL2 are still respectively outside the detection area $r_R$ of the stations of the other cluster CL2, CL1, the same resource for the data transmission is assumed for the subsequent consideration of the critical choice.

As explained above, it is assumed for the following considerations that the two clusters CL1, CL2 move towards each other so rapidly that an interfering interference occurs at the second moment in time T1, which interference causes a collision in the first receiving station R1.

At this second moment in time T1, the first receiving station R1 receives data from both transmitting stations S1, S2 and the interference becomes too great, as the intensity of interference $\Delta$ or the minimum decoding distance $r_D$ are exceeded. Thus, from this moment in time, it becomes much more probable that the first transmitting station S1 is no longer able to decode the desired received data.

Moreover, it is in the same way that the second receiving station R2 gets interference from the received data from the first transmitting station S1, in as far as the first transmitting station S1 approaches the second receiving station R2 to the same extent as is the case between the second transmitting station S2 and the first receiving station R1.

In order to implement a particularly preferred method, requirements are set in the following for mobile and non-mobile ad hoc networks. For example, the ratio of the colliding signals, the so-called signal to interference ratio to the second moment in time T1=T0+$\Delta t$ should not be less than a minimum value or the threshold value $\Delta$, which value is dependent in particular on the required bit error rate (BER) and on the coding used or on the modulation schema. Taking into consideration the receiving signal intensity $C_1 = C(T_1)$ in the first receiving station of the received signals C (t) from the first transmitting station R1 and the signal intensity $I_1 = I(T_1)$ of the receiving signal I (t) from the second transmitting station $S_2$, results in a difference that should be greater or equal to the threshold value $\Delta$:

$$C(T_1) - I(T_1) \geqq \Delta \quad (3)$$

The difference between a desired carrier signal C (t) and an undesired interfering interference signal I (t) is thus taken into account. For mobile ad hoc networks in particular, there is the challenge that, because of the time variance of mobile ad hoc networks, the evaluation or the checking of the network characteristics by the individual stations at the first moment in time $T_0$, cannot be sufficient to guarantee that a data transmission is sufficient at the second moment in time $T_1$ according to the time difference $\Delta t$. The greater the time difference $\Delta t$, the greater the probability that stations R1, S2 that are moving rapidly towards each other will interfere with each other, as their detection areas $r_R$ or decoding areas $r_D$ overlap.

Therefore, for mobile networks, especially mobile ad hoc networks, one should allow for the maximum interference $\Delta I$ from potentially occurring interference sources S2 and/or the loss $\Delta C$ of the received carrier signal strength C (t) at a first receiving station R1 for the entire duration of the transmission $\Delta t$ between the two measuring moments in time $T_0$ or $T_1$.

Looking at FIG. 3 in particular, it can be seen that the carrier signal level measured at the first moment in time $T_0$ has to fulfill the following equation in order to guarantee a successful data transmission up until the second moment in time $T_1$.

$$C_0 \geqq I_0 + \Delta I + \Delta C + \Delta. \quad (4)$$

Thereby possible loss due to interference effects is a function of the transmission duration or of the time interval $\Delta t$, of the velocity $v_{r1}$, $v_{max}$, of the stations R1, S1, S2 moving in the system and of the detection area $r_{min}$ or $r_R$. The detection area $r_R$ can also be expressed by the transmitting power $P_{max}$ used of the interfering second transmitting station S2 and the detection threshold of the carrier $I_{min}$ in the first receiving station $R_1$:

$$\Delta I = \Delta I(\text{transmission\_duration}\Delta t, \text{velocity: } v_{R1}, v_{max}, \text{detection\_range: } r_{min}) \quad (5)$$

$$= \Delta I\left(\frac{\text{transmission\_duration: }\Delta t, \text{velocity: } v_{R1}, v_{max}.}{\text{transmission\_power: } P_{max}, \text{threshold\_of\_carrier\_detection: } I_{min}}\right).$$

The losses of the desired carrier signal C(t) can be expressed as a function of the transmission duration, thus of the time interval $\Delta t$, of the velocity of the stations $V_{r1}$, $v_{s1}$ involved as well as of the distance $r_0$ between the first receiving station $R_1$ and of the interfering second transmitting station S2. On the other hand the distance can be expressed by the transmitting power $P_{max}$ of the second transmitting station S2 and of the receiving signal intensity $C_0$ on the desired carrier signal C(t):

$$\Delta C = \Delta C(\text{transmission\_duration } \Delta t, \quad (6)$$

$$\text{velocity: } v_{R1}, v_{S1}, \text{distance: } r_0)$$

$$= \left(\frac{\text{transmission\_duration}\Delta t, \text{velocity: } v_{R1}, v_{S1}.}{\text{transmission\_power}P_{max}, \text{received\_carrier}C_0)}\right).$$

Thus this gives two starting points that can be taken into consideration separately or in combination for the avoidance of interfering interferences when parameters are preset for transmit mode. In this connection, in the following, two combinable methods are described for optimizing the planning with transmit mode in an ad hoc network as an example of other types of network with a similar problematic nature.

These considerations are based on the assumption that the maximum possible transmission duration between two measuring moments in time T0 and T1, i.e. the differential time $\Delta t$, is a function of the velocity of the involved stations S1, R1, S2, R2, of the threshold value of the carrier detection $\Delta$, of the error correction capacity of the receiving stations R1, R2, of the modulation schema used, of the required bit error rate and of the receive power C(t) or I(t). All the parameters must be harmonized to provide a stabile network with an optimized data throughput.

The resulting set of parameters can be optimized by adapting the receiver, in particular by introducing adaptive carrier scanning. This set of parameters can also be optimized additionally or alternatively by adapting the set of parameters for the burst mode when transmitting, i.e. a burst mode adjustment or adaptation. The combination of these two methods is especially preferred.

Assuming a clear space attenuation and the use of isotropic antennae, the signal loss p can be expressed by $$p[\text{dB}] = 32.44 + 20 \log_{10}(r[\text{km}]) + 20 \log_{10}(fc[\text{MHz}]), \quad (7)$$

whereby r defines the distance between the first transmitter $S_1$ and the first receiver $R_1$ and whereby $f_c$ defines the carrier frequency. When allowing for wave propagation in a non clear space, the signal loss must be calculated accordingly. The same applies for the use of non-isotropic antennae, for example when sectoral antennae with directional beam or directional transmission are used. From this signal loss $\rho$ (formula 7), from the first measuring moment in time $T_0$ the second measuring moment in time $T_1$ with a simultaneous drifting away from the first transmitter $S_1$ at a differential velocity $\Delta = (v_{s1} + v_{r1})$, the desired receive signal or carrier signal C(t) of the first receiver $R_1$ experiences a carrier loss or loss of the desired receive signal $\Delta C$ of $$\Delta C[\text{dB}] = -(C_1 - C_0) \quad (8)$$

$$= 20\log_{10}(r_1/r_0)$$

$$= 20\log_{10}\left(1 + \frac{(v_{s1} + v_{R1})\Delta t}{r_0}\right).$$

Assuming a worst case scenario of an interference source in the shape of the second transmitting station $S_2$ within the detection area of the first receiving station R1 at the moment in time $T_0$ while simultaneously the second transmitting station $S_2$ is approaching the first receiving station $R_1$ up to the second moment in time $T_1$ at a maximum velocity of $v_{max}$, a maximum increase in interference $\Delta I$ can be derived from $$\Delta I[\text{dB}] = I_1 - I_0 \quad (9)$$

$$= 20\log_{10}\left(\frac{r_{min}}{r_{min} - (v_{max} + v_{R1})\Delta t}\right)$$

$$= 20 \log_{10}\left(\frac{1}{1 - (v_{max} + v_{R1})\Delta t / r_{min}}\right),$$

whereby $r_{min}$ corresponds to the minimum distance, i.e. the decoding area $r_D$, which must exist between the second transmitting station $S_2$ and the first receiving station $R_1$ to avoid any interference under normal circumstances.

Other scenarios make a corresponding modification of the above mentioned equations necessary, for example, looking at the attenuation conditions in the surrounding field, the dependence of r2 could be replaced by r$\alpha$ with $\alpha=2\ldots4$. Reference tables can also be used in order to take special environmental conditions, receive conditions or transmission conditions into account. In particular when directional antennae and similar are used, such reference tables can be used to particular advantage to enable the corresponding values in the formulas or in adapted formulas respectively to be adapted to the current conditions at the time. In this connection, it can also be useful to have signaling between the transmitting and receiving stations involved in order to inform the respective other stations of the station's own parameters and possible knowledge of special environmental parameters, so that other stations are also informed of the actual transmission or receive conditions in the respective environment area of a station.

In general, the approach can be adapted to all access medium control systems scanning the carrier and in which systems mobility must be allowed for. FIG. 4 shows selected components of a station Ri, Si which, in the method described on the following page, can be used as receiving station R1, R2, R3, and/or transmitting station S1, S2, S3. Thereby only those individual components are illustrated that are relevant to the understanding of the method described on the following pages.

Input data is received as per normal via an antenna and delivered to a receive device. Data to be transmitted are output by a transmission device to this or to another antenna. The transmission device and receive device are normally part of a transmit and receive device, which is referred to as transceiver TR. This transmit and receive device TR is connected with further devices, in particular with a control device, which is not illustrated, and a memory for the intermediate data storage and data processing.

The further components, which can, for example, be realized as a stand-alone software module or hardware module or as part of the control device, are used to carry out the method described. A threshold adjusting device IA for adjusting the threshold IT depending on the time has three module components for determining the differential intensity and also the other necessary parameters. This threshold adjusting device IA outputs in particular a dispatch confirmation, for example, the ready-to-send message CTS to the transmission device. Further, the threshold $\Delta$ for the carrier scanning is output to a carrier scanning device CS, which is preferably part of the receive device. The carrier scanning device CS transfers a carrier intensity value C0 to the threshold adjusting device IA. In addition, the receive device transfers a proposed burst control mode to the threshold adjusting device IA.

The station further includes another of these modules in the form of a velocity determining device VD, which determines the velocity of individual stations to each other from the available parameters. To this end, the velocity determining device VD receives especially corresponding data or signals of the receive device, of the carrier scanning device CS and/or threshold adjusting device IA. Conversely, the velocity determining device VD gives velocity values of the receiving station vR1, of the transmitting station vS1 and of the differential velocity vMax to the other devices, in particular to the threshold adjusting device IA.

Thus the station Ri, Si is divided into a receiving and a transmitting part. In order to enable carrier scanning, the signal strength C(t), I(t) of an incoming signal in the receiver device is measured and determined with the aid of the scanning device CS. If the signal strength exceeds a preset threshold value, the device permits the received signal C(t) to pass through the receive device in order to allow further signal and data processing. Further the carrier scanning device CS is used to detect a channel that is not used or an idle channel and to reserve for later access to such a channel.

The definition of the threshold value $\Delta$ of the differential intensity is thus of importance. If the threshold value $\Delta$ selected is too sensitive, the probability of detecting an assumingly clear interference signal I(t) can be too high, and, in fact, may even detect such when the channel would actually allow the transmission where the velocities were low. Access to the channel would not be allowed. Consequently, with respect to the optimum data throughput, a threshold value $\Delta$ which was too sensitive would clearly cause the system to deteriorate. If, on the other hand, the threshold value $\Delta$ selected is too high, the system is not sensitive enough to detect fast approaching interference sources S2, the sources would generate a lot of interference with respect to the burst transmitted at the moment or the corresponding data signals of a sequence of data. Such transmitting transmission signals C(t) would then be at least partially disturbed and it would no longer be possible to reconstruct them completely in the receive station. Therefore, there would be a loss of data, which would result in the data or signals having to be retransmitted. This would also worsen the throughput of the system. Therefore, an adapted algorithm is preferably sought that is suited to find an optimum value for the threshold value $\Delta$.

The measurement or estimation of the various velocities that affect the transmission conditions are important. These velocities are used for the method or algorithm sequence. Each mobile station can measure the velocities itself. In addition, or alternatively, the station can obtain the corresponding information from traffic services and, for example, have the information transmitted to it via a radio interface by a stationary station or by another mobile station. In general, a large number of velocity measurements and methods for estimating velocity can be used for the practical realization of the method. Velocity measurements of individual mobile stations or those made by their communication partners can be based on an independent measurement of own velocity, they can be determined from the distribution of "own" velocity to other mobile stations using the communication options via a radio channel, or alternatively be based on velocity measurements that were made location dependent, whereby the velocity of a vehicle is made by comparing the position of the mobile station at different moments in time, while the position of the mobile station is obtained by corresponding estimations from a receiving GPS signal (GPS: Global Position System).

The estimation of the maximum velocity vmax, which, as the worst case parameter, can be used in the method as the surest criterion, can be determined from measured or receiving values. Alternatively, an estimation of a position description based on a GPS signal can take place. For example, for use in urban areas maximum velocities vmax of 50 km/h can be chosen, but when using the method in the area of a motorway maximum velocities vmax of 250 km/h can be used.

As is sketched in the block of the threshold adjusting device IA, a preferred algorithm for adapting the threshold value $\Delta$ is made up of three steps, whereby the sequence illustrated must not necessarily take this form.

In a first step (1), the measured signal strength of the desired input signal C0 on the carrier is reduced by an estimate of the signal loss $\Delta C$. The estimated signal loss $\Delta C$ can be estimated from the velocity difference vS1+vR1 between the first transmitting station S1 and the first receiving station R1 as well as from the desired or necessary transmission time $\Delta t$ for the next transmission of data in order to then subtract the value of the measured input signal C0 at the first measuring moment in time T0.

In addition, in a second step (2), the resulting signal strength is reduced by the threshold value $\Delta$, whereby the threshold value $\Delta$ is formed by the necessary bit error rate, the modulation used and the coding schema used as well as further relevant values of this kind if necessary.

The third step (3) results in the signal strength being reduced by the maximum possible interference at the end of the desired transmission, i.e. at the moment in time T0+$\Delta t$, whereby in the calculation of the maximum possible interference, the occurrence or approach of an unknown interference source such as the second transmitting station S2 is assumed. The relative velocity of the approaching interference source or second transmitting station S2 is set as maximum probability in the safest calculation case, whereby the velocity of the first receiving station R1 is set as a reference velocity. Hence the relative velocity is given by the velocity vR1 of the first receiving station R1 increased by the maximum possible velocity of an interfering station S2. Further in the approaches, it is expediently assumed that while the channel conditions are being determined at the first moment in time T0, the detection area rR of the first receiving station R1 has already detected the interfering second transmitting station S2.

Alternatively, an allowance for the data of the second transmitting station S2 can also be transmitted via information from other stations per radio broadcast information or such like, so that it can be taken into consideration, in order to be able to allow for potential interfering stations that are not yet in the detection area rR as well. The result of the calculation determines an upper limit for the threshold value Δ of the channel scanning algorithm. As a precautionary measure, an additional safety tolerance of a few dB can also be allowed for when setting the threshold value Δ.

Advantageously, the first step (1) described can be left out if the movement of the first receiving station R1 and of the first transmitting station S1 within the cluster CL1 is minimal or is at least relatively small in relation to each other.

The measurement of the value of the desired receive signal C0 on the carrier can be left out if the position of the first transmitting station S1 and of the first receiving station R1 is known, at least relative to each other, so that it is possible to estimate the value of the receive signal C0 on the carrier.

To achieve a good estimation for the threshold value Δ, some parameters of the burst mode are required, e.g. the necessary transmission time, the modulation schema used, the transmitting power etc. These parameters should be defined at the transmission side and transmitted to the receiver side, which can be done, for example, in connection with the "ready to send message" RTS. In the event that such a message is not possible or not available, the influences from such parameters should be estimated by the first receiving station R1 at the receiver side, whereby e.g. a maximum burst size can be put as an estimate for the necessary transmission duration Δt. Such a maximum burst size can either be system set or if a burst may be used to transmit a maximum permitted number of transmittal data plus header section data or even, with regard to its size, is fixed to a specified size.

If the burst mode requirements on the one hand, and the velocities of the affected stations S1, R1, S2 on the other hand, necessitate a threshold value Δ that falls below a minimum value which can be realized by the corresponding stations R1, S1, then successful transmission of the data or of the data burst cannot be guaranteed. This information should be transmitted by the receiver side, i.e. by the first received station R1 to the transmitter side, i.e. to the first transmitting station S1. For simple implementation and integration into an existing standard, e.g. the standard according to IEEE 802.11, the "ready to send message" CTS, with which the first receiving station R1 signaled readiness to receive to the first transmitting station S2 should preferably not be transmitted in such cases.

Advantageously, the power control can also be considered as a parameter. In particular ad hoc networks that use an access schema based on carrier scanning are very sensitive with respect to uncoordinated power control mechanisms. An improvement of the above explained adaptive carrier scanning would stabilize ad hoc networks even in high velocity environments with such a power control mechanism. Below, we regard the difference between the maximum and the actual momentary transmitting power as power control gain gS1 of the corresponding transmitting station, present at the second transmitting station S2. If the actual transmitting power is set at a minimum value, the power control gain gS1 achieves its maximum value gmax. Equation (3) should then be modified to $$C_0 \geq I_0 + \Delta I + \Delta C + \Delta + g_{max} - g_{s1}. \quad (10)$$

If the power control gain $g_{s1}$ of the first transmitting station S1 is not available at the first receiving station R1, the parameter for the power control gain $g_{s1}$ is ignored or set at zero in the above equation (10).

A conversion in the Standard IEEE 802.11 is in particular possible for converting adaptive carrier scanning of this kind to improve the medium access control schema based on carrier scanning in high velocity environments, e.g. for communications between vehicles. In this case, no modifications need to be made to the standardized protocol. A sensible requirement would be that the standard allowed or did not exclude adjustable threshold values A for carrier scanning. The transmission of burst mode parameters would be useful but not absolutely necessary.

A transmitting station S1 can determine whether a communicating receiving station R1 supports the method, although the determination of the threshold value for the carrier scanning is actually an internal parameter of the receiving station R1. A transmitting station S1 with adjustable power amplifiers can make simple measurements for this. After a ready to send message RTS has been sent out, detection can be determined by the receipt of the confirming ready to send messages signal.

Figure 5:
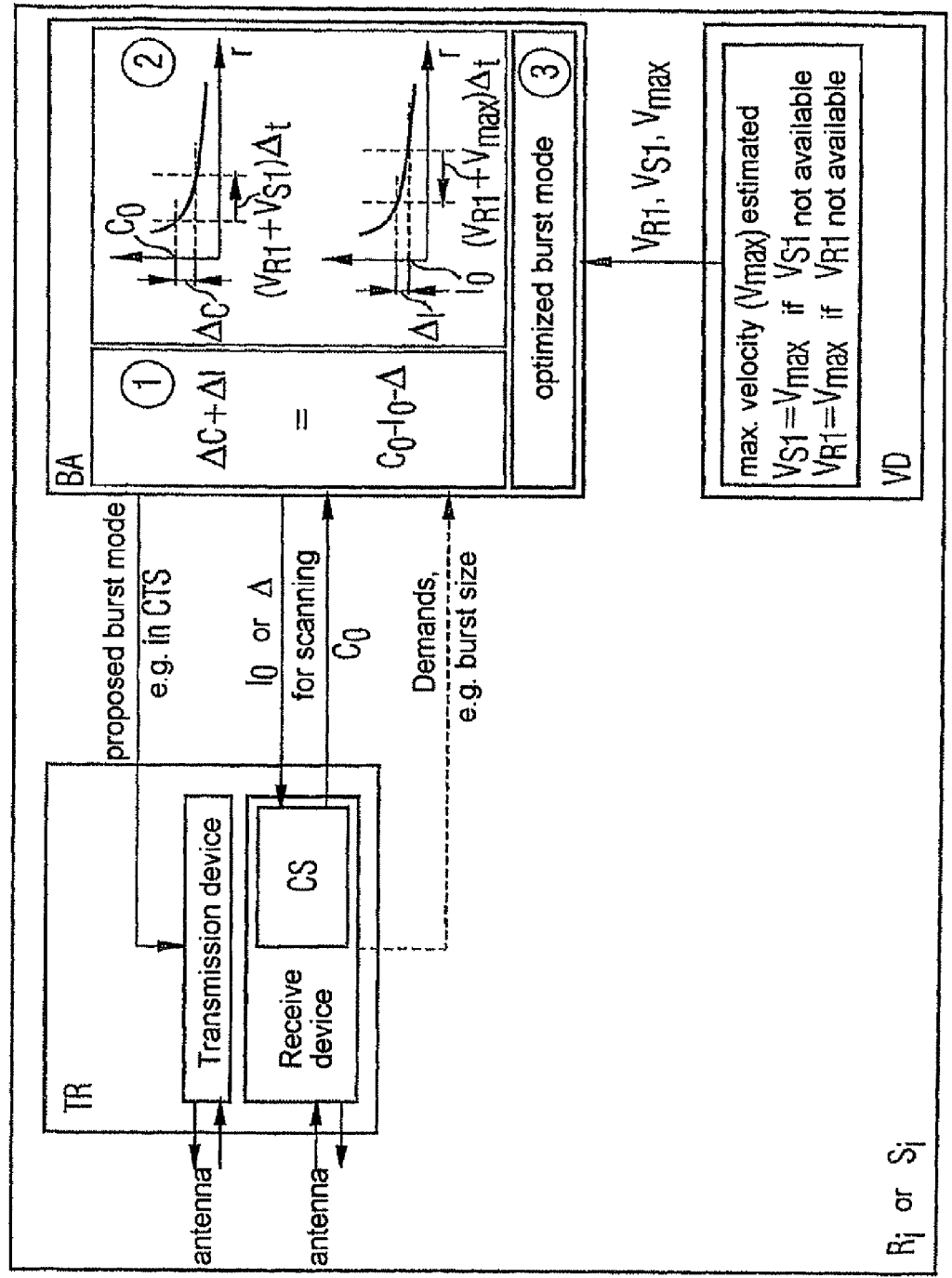

The second possible method is in the burst mode setting and is illustrated using FIG. 5. To simplify the description, only differences between FIG. 5 and FIG. 4 are highlighted. The comments on FIG. 4 apply for all other structural and functional elements.

For the burst mode setting, a burst mode setting device BA is used instead of the threshold adjusting device IA described above. Accordingly, the burst mode setting device BA transmits a proposed burst mode instead of the dispatch confirmation to the transmission device in the transmit and receive device TR. This transmission can, for example, be made as part of the ready to send message CTS.

Instead of a transmission of the threshold value Δ to the receive device in the transmit and receive device TR, in this burst mode setting, the initial signal strength, or the intensity I0 and/or the threshold value Δ is transmitted from the carrier scanning device CS to the burst mode setting device BA. In addition the receiver device in the transmit and receive device TR now transmits demands such as, for example, burst size in bits instead of the suggested burst mode or the burst mode to the burst mode adjusting device BA.

Optimized burst modes or burst modi are determined in the burst mode adjusting device BA in addition to the various calculation steps.

As already described in the method of the adaptive carrier scanning, in the burst mode setting, it is also possible to adapt the receiver device, here in particular the first receiving station R1. Alternatively to the above described method, here, however, the mode for the burst transmitted is adapted. Here only the differences are highlighted as the method is very similar to that described above.

The threshold value Δ is predetermined by the carrier scanning device CS in the transmit and receive device TR. Alternatively, the signal strength I0 measured at the first measuring moment in time T0 from one or several interference sources, e.g. the second transmitting station S2 can be transmitted to the burst mode-adjusting device BA.

The demands such as e.g. die burst size in bits should preferably be transmitted from the transmission device to the receiver, thus, for example, from the first transmitting station S1, which wants to transmit data, to the first receiving station R1, which should receive the data. If this is not possible, standard values, which are then to be taken, can be used for the worst conceivable case, e.g. a maximum burst size.

An optimum configuration of the data burst transmitted is defined at the receiver side, that means, for example, by the first receiving station R1 setting the burst duration or the available transmitting time Δt and the transmitting power. The configuration is transmitted from the first receiving station R1 to the first transmitting station S1 wishing to send the data. Therefore, the protocol must be modified for a conversion in the standard IEEE 802.11.

Finally, signaling from the first receiving station R1 to the first transmitting station S1 is modified in order to transmit the corresponding data or configurations. Using the composition of data receiving in this manner, the first transmitting station S1 can recognize that the first receiving station R1 it addressed is ready to carry out the procedure.

Using the two methods proposed, a stable operation can also be guaranteed with ad hoc communications where the individual transmitting and receiving stations are highly mobile, if use is made of these medium access control schemata that are based on carrier scanning. Due to the time variance of mobile ad hoc networks, it is true that the estimation or the examination of the network status at a first moment in time T0 is not sufficient to guarantee a data transmission at a usual later examination moment in time T1=T0+Δt. However, by introducing the two methods taken individually or in combination, the access schemata with carrier scanning in high velocity environments can also be used. The threshold value for the carrier scanning and the parameters for the data burst setting, e.g. transmitting power, transmission moment in time, transmission duration, modulation schemata etc. are determined according to the measured velocity between the individual stations in the radio communication system. Hence maximum possible occurring velocities can also be allowed for in the system in order to adapt the transmitting parameters in such a way that collisions due to stations emerging quickly can be excluded.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for transmitting a sequence of data in a radio communication system, comprising:
    checking a radio interface for an interference signal of an interference source, by at least one of a first transmitting station and a first receiving station, to detect an approach of the interference source relative to the first receiving station;
    determining according to a first threshold a maximum possible transmission duration for interference free transmission of the sequence of data, based on at least one of an expected change in intensity of the interference signal and an expected change in intensity of a transmission signal;
    after said checking, generating a transmission signal at the first transmitting station for transmitting the sequence of data to the first receiving station via the radio interface during a length of time not exceeding the maximum possible transmission duration for interference free transmission; and
    at least one of determining and estimating a second threshold value for a minimum required difference between the intensity of the transmission signal and the intensity of the interference signal as a measurement for a non-interfering signal that does not interfere with the transmission signal.

2. A method according to claim 1, further comprising determining a decoding area around the first receiving station within which the interference signal of the interference source causes unacceptable interference.

3. A method according to claim 2, further comprising exchanging, between the first receiving station and the first transmitting station, parameters at least one of relating to a corresponding station, determined in the corresponding station and relating to transmission conditions.

4. A method according to claim 2, further comprising locating, by the first receiving station, a usual interference source within a detection area based on a determinable velocity of the first receiving station and a transmitted velocity of the interference sources within the detection area of the first receiving station.

5. A method according to claim 3, wherein said exchanging exchanges at least one of the first threshold value and the maximum possible transmission duration.

6. A method according to claim 3, wherein at least one of a usually maximum possible and maximal sensible velocity is used for the stations and interference sources for which no velocity information is available, at least one of within and outside a detection area of the first receiving station.

7. A method according to claim 1, further comprising one of determining and estimating an expected increase in intensity of the interference signal at the first receiving station using at least one of actual and maximum possible relative velocity of the interference source and the first receiving station to each other.

8. A method according to claim 1, further comprising one of determining and estimating an expected increase in intensity of the interference signal at the first receiving station as a function of at least one of the actual and maximum possible relative velocity of the first transmitting station and of the first receiving station to each other.

9. A station for transmitting a sequence of data in a radio communication system with mobile stations and mobile interference sources, comprising:
    a memory; and
    one or more processing devices configured to execute:
        checking a radio interface for an interference signal of an interference source by at least one of the mobile stations to detect an approach of a mobile interference source relative to a mobile station;
        determining according to a first threshold a maximum possible transmission duration for interference free transmission of the sequence of data, based on at least one of an expected change in intensity of the interference signal and an expected change in intensity of the transmission signal;
        after said checking, generating a transmission signal at rhea first transmitting mobile station for transmitting the sequence of data to rhea first receiving mobile station via the radio interface during a length of time not exceeding the maximum possible transmission duration for interference free transmission; and
        at least one of determining and estimating a second threshold value for a minimum required difference between the intensity of the transmission signal and the intensity of the interference signal as a measurement for a non-interfering signal that does not interfere with the transmission signal.

10. A station according to claim 9, wherein a transmitting mobile station not involved in the intended transmission of the sequence of data is a mobile interference source.

* * * * *

UNITED STATES PATENT AND TRADEMARK OFFICE
CERTIFICATE OF CORRECTION

PATENT NO.       : 8,175,062 B2                     Page 1 of 1
APPLICATION NO.  : 12/241994
DATED            : May 8, 2012
INVENTOR(S)      : Rüdiger Halfmann et al.

It is certified that error appears in the above-identified patent and that said Letters Patent is hereby corrected as shown below:

Column 16, Line 51 (Approx.), In Claim 9, delete "rhea" and insert -- a --, therefor.

Column 16, Line 52 (Approx.), In Claim 9, delete "rhea" and insert -- a --, therefor.

Signed and Sealed this
Thirty-first Day of July, 2012

David J. Kappos
*Director of the United States Patent and Trademark Office*